UNITED STATES PATENT OFFICE.

NIVEN McCONNELL, OF MUNHALL, PENNSYLVANIA.

CHROME BRICK.

SPECIFICATION forming part of Letters Patent No. 579,998, dated April 6, 1897.

Application filed July 8, 1896. Serial No. 598,499. (No specimens.)

*To all whom it may concern:*

Be it known that I, NIVEN McCONNELL, of Munhall, in the county of Allegheny and State of Pennsylvania, have invented a new and useful Improvement in Chrome Bricks, of which the following is a full, clear, and exact description.

My invention relates to the manufacture of refractory bricks containing chrome ore, and is designed to afford a new composition for bricks which when burned shall give a very strong and durable article. These bricks as heretofore made with a binder of tar or of similar material have proved very friable and easily broken when used and last only a short time. I have discovered that by adding a percentage of a refractory clay to the chrome ore a composition is afforded which when burned becomes very strong and hard.

In carrying out my invention I preferably grind up the chrome ore and then add the desired percentage, say twenty-five per cent., of a refractory clay, such as bauxite, which I have found very satisfactory for this purpose. The mixture is then ground together while wet, and, being taken out, is molded and burned in the usual way, giving a brick which is very strong and tenacious and far less friable than former chrome bricks.

The chrome ore which I employ ordinarily contains forty-five per cent. of chrome, about ten per cent. of iron oxid, ten per cent. of silicon, and twenty per cent. of magnesia, though I do not wish to be restricted to any particular grade of the ore.

The particular refractory clay employed may be varied as desired, and other materials may be added to the mixture without departing from my invention, since

I claim—

1. As a new article of manufacture, a brick composed of chrome ore containing about twenty-five per cent. of a refractory clay.

2. As a new article of manufacture, a brick composed of chrome ore containing about twenty-five per cent. of bauxite.

In testimony whereof I have hereunto set my hand.

NIVEN McCONNELL.

Witnesses:
G. I. HOLDSHIP,
C. BYRNES.